United States Patent Office 3,223,032
Patented Dec. 14, 1965

3,223,032
GRAINING PROCESS
Harold Boardman and Richard L. Wagner, Wilmington, Del., assignors to Hercules Powder Company, Wilmington, Del., a corporation of Delaware
No Drawing. Filed Oct. 4, 1963, Ser. No. 313,753
11 Claims. (Cl. 101—149.2)

This invention relates to a process of preparing laminates. More particularly, the invention relates to a process for preparing plastic-metal foil laminates in which the metal surface bears a lithographic grained finish.

Grained lithographic plates of one type or another have been known for a great many years. The first plate was merely a porous slab of Kelheim stone used by Alois Senefelder in 1796. Today in the art of fine lithographic printing, grained metal plates, particularly aluminum and zinc, or used. Probably the most important advantage of a grained plate over an ungrained plate is that it is more easily and evenly wet either by ink or water. In addition, the graining promotes better adhesion of the photo synthesized coating resulting in longer press runs and necessitates fewer changes in the ink-water balance during the press run. While there is no satisfactory way to absolutely characterize the graining on these plates, it can be generally described as a microscopic surface roughness essentially devoid of scratches. From a scientific point of view, it can be described in terms of grain depth and increase in surface area. In general, the depth of the graining will vary from about 0.00015 inch to about 0.0015 inch and the ratio of the surface area of a grained plate to the surface area of an ungrained plate will vary from about 1.6 to about 6.0.

It is known to prepare such plates by covering a metal sheet with a slurry of finely divided abrasive material such as silica or pumice and then rolling glass of steel balls on the surface by means of a mechanically rotatable table (commonly known as "tub graining"). This process produces a high quality grained plate for long run lithographic printing jobs. However, the process is time consuming and messy while the resulting plates are costly and difficult to reproduce. Chemical etching and sand blasting techniques are also used to prepare grained plates, but the products are either inferior to that obtained by the above-mentioned method or equally costly and difficult to reproduce.

It has now unexpectedly been found that excellent quality lithographic grained plates can be prepared by pressing a grained metal master plate into the surface of a thin metal foil laminate bonded to a thermoplastic substrate.

Accordingly, this invention relates to a process for graining the metal surface of a laminate of a metal foil bonded to a thermoplastic substrate which comprises contacting the metal surface of said laminate with a lithographic grained master plate under a pressure of at least 200 p.s.i., most preferably at least 500 p.s.i.

Any nonresilient thermoplastic stiff enough to withstand wrinkling but soft enough (either inherently or when heated) to allow the metal foil surface to sink in and replicate the graining from the master, can be used in the process of this invention. Thus, the thermoplastic should have a Rockwell R hardness of less than 95 (at the temperature at which graining is effected), a Shore D hardness of at least 40 (at room temperture) and a compressive strength of at least 900 p.s.i. (at room temperature). Exemplary thermoplastics are polyethylene, polypropylene, crystalline ethylene-propylene copolymers, polystyrene, cellulose esters such as cellulose acetate butyrate, cellulose ethers such as ethyl cellulose, polyesters such as poly(ethylene terephthalate), and ethylene terephthalate-ethylene azelate copolymer, poly(alkylene oxides) such as isotactic poly(ethylene oxide), polyamides such as nylon, polyaldehydes such as poly(formaldehyde), polycarbonates such as the condensation product of bis phenol A and phosgene, poly(vinyl alkyl ethers) such as poly(vinyl methyl ether), poly(vinyl acetals) such as poly(vinyl butyral), poly(vinyl chloride), poly (vinyl alcohol), vinyl choride-vinyl acetate copolymers, vinyl chloride-vinylidene chloride copolymers, vinyl chloride-vinyl butyral copolymers, nitrocellulose, poly(vinyl acetate), poly(vinylidene chloride), poly(ethyl acrylate), poly(methyl methacrylate), poly(ethyl methacrylate), poly[3,3-bis(chloromethyl) oxetane], chlorinated and flourinated ethylene polymers such as poly(tetrafluoroethylene), etc., and blends of these plastics with each other. In certain cases, it may be desirable to blend (alloy) one of the above plastics with a small amount of an elastomer such as polyisobutylene, amorphous ethylene-propylene copolymers, ethylene-propylene- cyclopentadiene terpolymers, styrene-butadiene copolymers, styrene-acrylonitrile copolymers, etc. When such blending is carried out the amount of elastomer added will be limited so as to maintain the required hardness and compressive strength set forth above. The thickness of the thermoplastic substrate is not critical but will in general be at least 3 mils. It can, of course, contain additives such as extenders, fillers, plasticizers, stabilizers, etc., but the presence or absence of such additives is immaterial to this invention. Any metal which can be produced as a thin foil can be used as the metal laminate in the process of this invention. Preferably, the metal will be zinc or aluminum. In addition to these, other metal foils such as copper, stainless steel, Monel, nickel and magnesium foils can be used. The thickness of the foil will vary, depending upon the hardness of the metal, the hardness of the plastic substrate, the amount of pressure being used to grain the metal, etc. In general, however, metal foils having a thickness between about 0.01 inch and about 0.0001 inch will be used.

The metal foil can be bonded to the thermoplastic substrate by a number of methods. For example, a thin interlayer of adhesive can be placed between the metal foil and plastic. The use of an adhesive interlayer of material softer than the plastic substrate allows the use of lower graining temperature and pressure. When using certain thermoplastics, chemical compounds can be incorporated which increase the adhesion of the plastic to metal. With still other plastics, such as nylon, an adhesive or chemical additive is not required. Usually the metal foil will be bonded to the plastic substrate before graining. However, in those cases where bonding takes place at the temperature and pressure required for graining, the two processes can be carried out simultaneously. In some cases, it may be desirable to laminate the metal foil to both sides of the plastic.

Any lithographic grained plate can be used as the master plate in the process of this invention. Usually the master will be a metal lithographic grained plate as used in the printing trade. However, a metal press with a grained face plate or a calender roll with a grained surface could also be used. Thes master plates can be prepared by any well-known method, such as the tub graining method described above.

As stated above, the process of this invention comprises pressing a lithographic grained metal master plate into the surface of a thin metal foil laminate bonded to a thermoplastic substrate. This process can be carried out at any temperature from room temperature to a temperature just below the melting or softening point of the plastic substrate. The pressures required to obtain good replicates range from about 200 p.s.i. to about 10,000 p.s.i., most preferably from about 500 p.s.i. to about 5,000 p.s.i. The specific temperature used will vary inversely to the pressure and will also depend upon the particular metal and plastic employed.

The following examples are presented for purposes of illustration, parts and percentages being by weight unless otherwise specified.

*Example 1*

A sheet of hard temper aluminum foil 0.0005 inch thick was laminated to a 0.025 inch thick sheet of polypropylene having a molecular weight of approximately 550,000, a Rockwell R hardness of 95 at room temperature, and a compressive strength of 9,000 p.s.i. (ASTM D695). The polypropylene contained 1% by weight of methylene bis(acrylamide) to promote adhesion. A section of the resulting laminate 6 inches x 18 inches was placed in a press and on its aluminum foil surface was placed a commercial aluminum master plate grained with a No. 6-0 lithographic finish. The grained plate and the laminate were then subjected to a pressure of 750 p.s.i. for 5 minutes at a temperature of 155° C. The metal surface of the resulting grained laminate was examined microscopically and found to be an excellent reproduction of the master plate. The grain on the master plate was also microscopically examined and found to be unaffected by the process. As a comparison, the same process was carried out using a 0.016 inch sheet of hard temper aluminum. There was no transfer of the graining and the master plate was badly damaged.

The grained laminate was converted to a lithographic plate by coating with a commercial ink-receptive photo resist. After exposure with an image bearing transparency and development of the plate, it was run on an offset lithographic press. The resulting print was of excellent quality.

*Example 2*

A laminate was prepared from the 0.0005 inch aluminum foil described in Example 1 and a 0.025 inch sheet of polyethylene having a molecular weight of 150,000, a Shore D hardness of 65 at room temperature and a compressive strength of 2,400 p.s.i. (ASTM D695). Methylene bis(acrylamide) was added to the polyethylene in an amount of 1% prior to lamination. The resulting laminate was contacted with a grained aluminum master plate for 5 minutes at room temperature under a pressure p.s.i. and a temperature of 70° C. for 5 minutes. Microscopic examination showed that the lithographic graining from the master plate had been replicated in the aluminum foil surface of the laminate.

*Example 3*

A laminate of aluminum foil and polypropylene sheeting was bonded using a thin interlayer of a relatively soft (Shore D hardness of 42) polyvinyl acetate emulsion adhesive. The aluminum foil and polypropylene used were as described in Example 1 except the polypropylene contained no methylene bis(acrylamide). A section of this laminate was pressed with a grained aluminum master plate for 5 minutes at room temperature under a pressure of 1,000 p.s.i. Microscopic examination showed that the graining from the master plate had been replicated in the aluminum foil surface of the laminate.

*Example 4*

A laminate was prepared by fusing a 0.018 inch sheet of polycaprolactam, having a density of 1.13, a Rockwell R hardness of 103 at room temperature, and a compressive strength of 8,000 p.s.i. (ASTM D695), to a sheet of aluminum foil 0.001 inch thick. A grained aluminum master plate 0.02 inch thick was placed on the aluminum foil surface of a section of the laminate and the resulting sandwich run through the nip of large steel calender rolls heated to a temperature of 121° C. The nip gap distance was approximately 0.03 inch. Microscopic examination showed that the graining from the master plate was replicated in the aluminum foil surface of the laminate.

*Example 5*

A laminate was prepared by pressing a 0.001 inch sheet of zinc foil onto a 0.025 inch sheet of an ethylene terephthalate-ethylene azelate copolymer containing 65% ethylene terephthalate and having a Rockwell R hardness of 29 at room temperature, a softening point of 172° C. and a specific viscosity of 0.81 as determined on a 0.1% solution in a mixed phenol-tetrachloroethylene solvent, at a temperature of 25° C. The resulting laminate was grained with a grained aluminum master plate exactly as described in Example 4.

What we claim and desire to protect by Letters Patent is:

1. A process for graining the metal surface of a laminate of a metal foil having a thickness between about 0.01 inch and about 0.0001 inch bonded to a thermoplastic substrate having a Rockwell R hardness of less than about 95 at the temperature at which graining is effected, a Shore D hardness of at least 40 at room temperature and a compressive strength of at least 900 p.s.i. at room temperature, which comprises contacting the metal surface of said laminate with a lithographic grained metal master plate under pressure of from about 200 p.s.i. to about 10,000 p.s.i. at a temperature below the melting point of the thermoplastic.

2. The process of claim 1 wherein the thermoplastic substrate is a polyolefin.

3. The process of claim 2 wherein the polyolefin is polypropylene.

4. The process of claim 1 wherein the thermoplastic substrate is polyethylene.

5. The process of claim 1 wherein the thermoplastic substrate is polyamide.

6. The process of claim 1 wherein the thermoplastic substrate is ethylene terephthalate-ethylene azelate copolymer.

7. The process of claim 1 wherein the metal foil is aluminum foil.

8. The process of claim 1 wherein the metal foil is zinc foil.

9. The process of claim 1 conducted at an elevated temperature.

10. The process of claim 1 wherein the metal foil is aluminum foil, the thermoplastic substrate is polypropylene and the metal surface of said laminate is contacted with the lithographic grained metal master plate under a pressure of from about 500 p.s.i. to about 5000 p.s.i.

11. The process of claim 10 wherein the aluminum foil is bonded to the polypropylene substrate with a thin interlayer of a relatively soft adhesive and the graining is carried out at room temperature.

References Cited by the Examiner

UNITED STATES PATENTS

| | | | |
|---|---|---|---|
| 1,863,976 | 6/1932 | Fischer | 101—149.2 |
| 2,048,964 | 7/1936 | Osborn | 101—149.2 |
| 2,719,481 | 10/1955 | Botthof et al. | 101—149.2 |

FOREIGN PATENTS

| | | |
|---|---|---|
| 745,190 | 2/1956 | Great Britain. |

DAVID KLEIN, *Primary Examiner.*